April 13, 1965 L. HILLMAN 3,178,639
APPARATUS HAVING A WHEATSTONE BRIDGE CIRCUIT FOR TESTING
CONTINUITY AND LEAKAGE IN ELECTRIC CABLES
Filed June 26, 1961 2 Sheets-Sheet 1
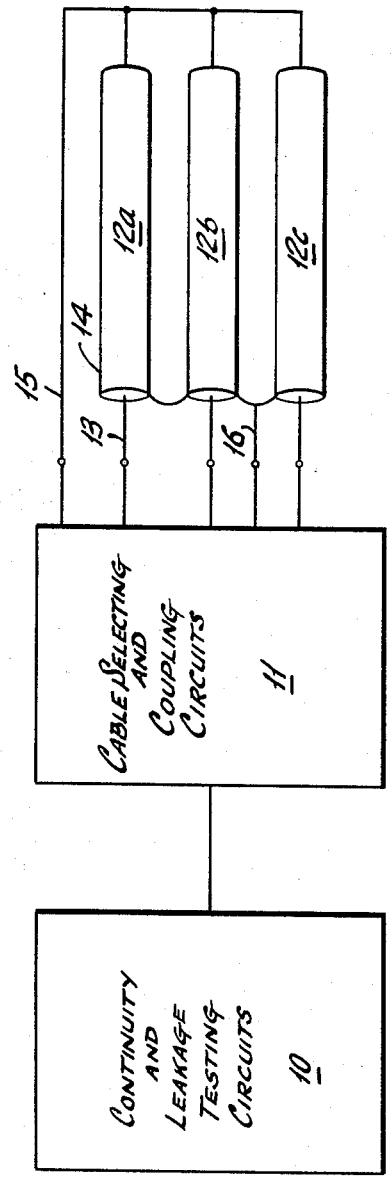
INVENTOR
LEON HILLMAN
BY
ATTORNEY

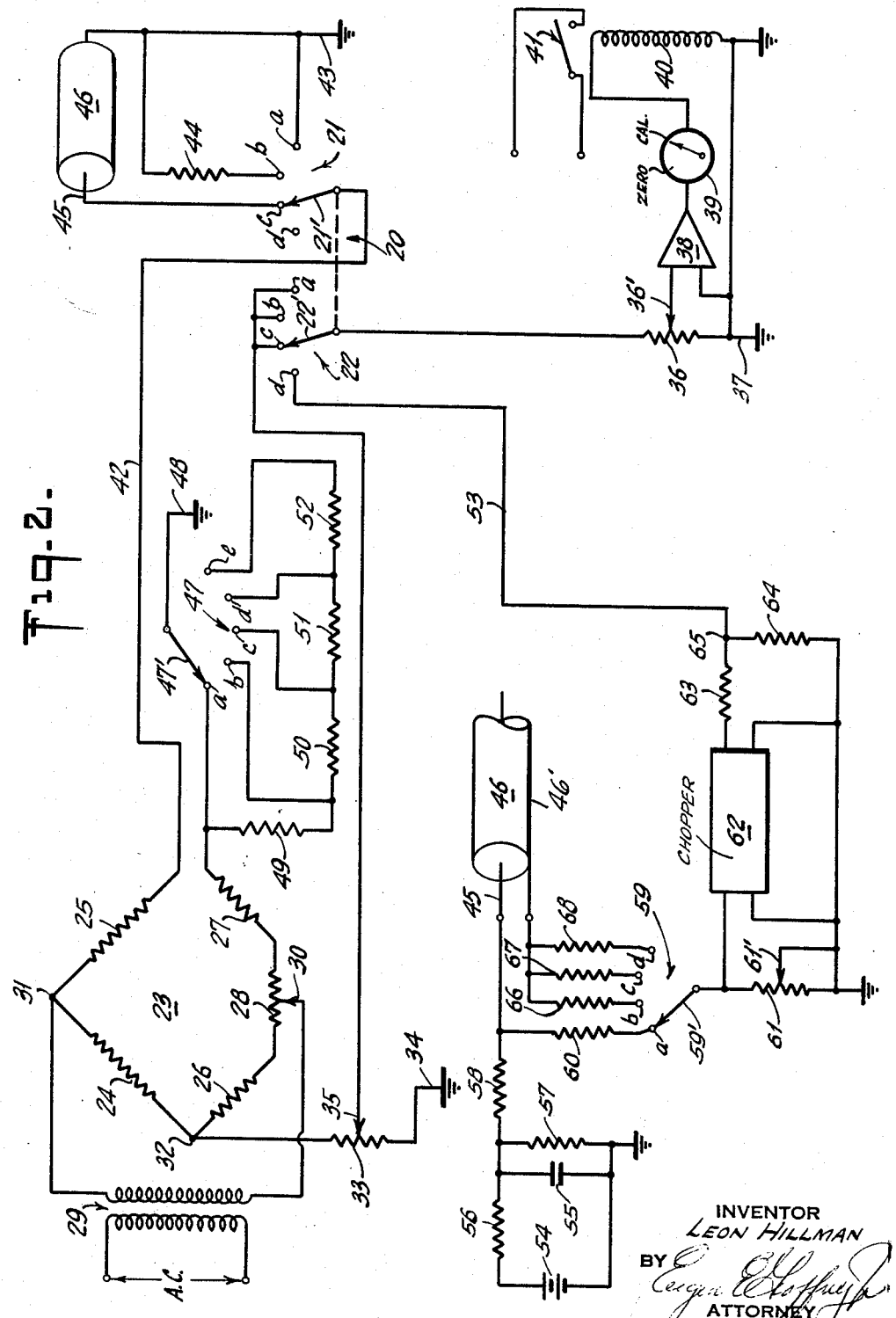

United States Patent Office 3,178,639
Patented Apr. 13, 1965

3,178,639
APPARATUS HAVING A WHEATSTONE BRIDGE CIRCUIT FOR TESTING CONTINUITY AND LEAKAGE IN ELECTRIC CABLES
Leon Hillman, 355 Liberty Road, Englewood, N.J.
Filed June 26, 1961, Ser. No. 126,457
3 Claims. (Cl. 324—54)

This invention relates to testing apparatus and more specifically to novel and improved equipment for testing circuit continuity and leakage between the circuit being tested and either adjoining circuits or ground.

While the invention is generally useful it is particularly applicable to testing cables and is readily adaptable for use in automatically testing a plurality of cables for both continuity and leakage.

In addition to the foregoing advantages, the invention has as one of its objects the provision of improved circuitry for effecting continuity and leakage tests and at the same time affording means for indicating whether a given cable or circuit under test meets certain minimum standards.

Another object of the invention resides in a novel and improved circuit for testing both continuity and leakage that is characterized by its simplicity, dependability and relatively low cost.

Still another object of the invention resides in the provision of a novel and improved testing device which is readily adaptable for automatic operation for sequentially testing a plurality of cables and automatically indicating faulty cables.

A further object of the invention resides in novel and improved apparatus for testing continuity and leakage in electric cables.

The above and other advantages of the invention will become more apparent from the following description and accompanying drawings forming part of this application.

In the drawings:

FIG. 1 is a block diagram of one embodiment of the invention; and

FIG. 2 is a circuit diagram showing the testing apparatus of the embodiment of the apparatus shown in FIG. 1.

Referring to FIG. 1 the block 10 represents continuity and leakage testing circuits as will be described in connection with FIG. 2 and block 11 represents cable selecting and coupling circuits to connect each of a succession of cables to the block 10 in order to determine whether the cable meets certain prescribed standards. The numerals 12a, 12b, 12c, etc. denote a plurality of cables which are connected to the cable selecting and coupling circuits for purposes of test. It is understood that any number of such cables may be applied although three are shown for illustrative purpsoes. For convenience in describing the invention, the cables 12a, 12b, etc. have been illustrated as coaxial cables having a central conductor 13 and a surrounding shield 14. In many electrical circuits each conductor is separately shielded and accordingly it is important to test not only the continuity of the cable through its central conductor 13, but also the leakage from the insulated central conductor 13 to the surrounding shield 14. In other cases, a plurality of conductors 13 may be utilized within a single shield and in such case, the leakage tests would be made between each individual conductor and the remaining conductors connected one to the other and to the shield. In this way the minimum leakage between a selected conductor and one or more of the other conductors would be determined. In performing the continuity tests one end of the central conductor 13 of each of the cables is connected to the cable selecting and coupling circuits 11. The other end of each of the conductors 13 are connected together and then to the cable selecting and coupling circuits by lead 15. In this way each cable can be tested in sequence by appropriate apparatus including automatically actuated stepping switches to successively introduce each conductor 13 into circuit with the continuity and leakage testing apparatus of block 10. When the continuity tests have been completed, the leakage tests can be effected, since the shields 14 of each of the conductors are connected one to the other and then by a common lead 16 to the cable selecting and coupling circuitry.

In addition to the manual or automatic scanning of cables to be tested as described above, the apparatus contained within the block 11 may also be provided with a signal system responsive to the continuity and leakage tests effected by block 10 which functions to halt the automatic testing procedure in the event a cable is located which does not meet predetermined minimum requirements.

Referring now to the circuit illustrated in FIG. 2, which performs both continuity and leakage tests on cables, the specific test to be conducted is selected by means of a function selector switch 20 comprising individual switch decks 21 and 22 each having four positions a, b, c and d. The positions a, b and c of the switch 21 are for the purpose of calibrating the equipment for measurement of continuity and for making the continuity tests, while position d is for making leakage tests.

Considering now the continuity circuitry, the basic measuring means constitutes a bridge 23 having legs 24, 25, 26 and 27, each of which comprises a resistor. The legs 26 and 27 are connected to a potentiometer 28 and an A.C. current obtained from the transformer 29 is applied between the movable potentiometer contactor 30 and and the junction 31 of bridge legs 24 and 25. The junction 32 of the legs 24 and 26 of the bridge is connected through a potentiometer 33 to ground 34 and the movable contactor 35 of the potentiometer 33 is connected to contacts a, b and c of switch 22. The contacting arm 22' of switch 22 is connected through a potentiometer 36 to ground 37 and the movable contactor 36' is connected to an amplifier 38. The output of the amplifier is fed through a meter 39 to a relay coil 40 which operates to close the contacts 41 and produce a signal in an external circuit.

The leg 25 of the bridge 23 is returned to ground by way of the lead 42, contactor 21' of the switch 21 and one of the three contacts a, b or c. The contact a is connected directly to the ground 43, the contact b is connected to the ground 43 through a resistor 44 and the contact c is connected to ground through the conductor 45 of the cable 46 being tested. The leg 27 of the bridge is connected to ground by means of the selector switch 47 having contacts a, b, c, d and e and a movable contactor 47', the latter being connected directly to the ground 48. The switch point b is connected through a resistor 49 to the leg 27 of the bridge and successive switch contacts c, d and e introduce still additional resistors 50, 51 and 52 in series with the bridge leg 27.

With the circuit as described and with the switch 20 at point a, and switch 47 at point a, the legs 25 and 27 of the bridge are connected directly to ground and any unbalance of the bridge 23 will be amplified by the amplifier 38 and will produce a current reading on the meter 39. The contactor on the potentiometer 28 is then adjusted until the meter 39 reads zero. In order to be sure that an accurate reading is obtained, the potentiometers 33 and 36 can be adjusted to increase the voltage applied to the amplifier 38, though normally on initial adjustments these potentiometers would be set at approximately their mid range. Having accomplished this step of the operation, the equipment is now ready to be calibrated and for this purpose the switch 20 is moved to the position b. In so doing, the switch section 21' causes the resistor 44 to be placed in series with the switch leg 25 and in practical applications the resistor 44 may be of the order of 1 to 1½ ohms. The potentiometer 33 is then adjusted to cause the meter 39 to read a predetermined voltage identified by the letters "CAL" which is an abbreviation for the word "calibrate." This voltage is sufficient to actuate the relay 40 and associated contacts 41. The circuitry is now ready to test the continuity of the cable 46 and for this purpose the switch 20 is moved to position c.

It will be observed that when the switch 20 is at position c, the conductor 45 of the cable 46 is in series with the leg 25 of the bridge. Assuming that the resistor 44 is 1½ ohms, then, should the cable exceed 1½ ohms, it will cause the relay 40 to be actuated. Since many cables are generally required to have less than 1½ ohms resistance while others may be satisfactory when they have considerably greater resistance, the selector switch 47 is provided so that only those cables exceeding a value determined by the selector switch 47 will operate to actuate the relay 40. Assuming that the resistor 49 has a resistance of one ohm, then, with the selector switch 47 at position b, should the resistance of the cable 46 equal or exceed 2½ ohms, it will actuate the relay 40. Assuming further that the resistors 50, 51 and 52 are 4 ohms, 5 ohms and 15 ohms, then with the switch 47 positioned at points c, d and e, cables having resistances exceeding 6½, 11½ and 26½ ohms can be automatically detected as defective cables.

From the foregoing it is apparent that by the utilization of suitable automatic apparatus to successively connect cables to the contact c of switch 21, the equipment will automatically test a plurality of cables. Furthermore, the automatic means may be interconnected with the switch contacts 41 of the relay 40 to interrupt operation of the automatic means should a faulty cable be detected.

Cable leakage can be measured by shifting the switch 20 to the position d and it will be observed that in so doing the lead 53 from the leakage test circuit will be fed through the switch 22 to the potentiometer 36. The leakage test circuit includes a relatively high voltage source 54 which, for purposes of simplicity, is illustrated as a battery. This source is connected across a condenser 55 with a resistor 56 in series therewith, the resistor 56 and the condenser 55 functioning to filter the source 54. A load resistor 57 is connected across the condenser and one side of the condenser 55 and resistor 57 is connected to ground. The other side of the condenser 55 and resistor 57 is connected through a series resistor 58 to the central conductor 45 of the cable 46. A leakage range selector switch 59 having contacts a, b, c and d permit selection of allowable leakage in a cable before actuation of the relay 40. When the contactor 59' of the switch 59 is at point a, a predetermined resistance of, for instance, 100 megohms is inserted in the circuitry in place of the cable 46, so that current will flow from resistor 58 through the resistor 60 and through switch 59 to a potentiometer 61 and then to ground. The contactor 61' of potentiometer 61 is connected to ground to short a portion of the potentiometer and modify the voltage being fed to a chopper 62 which provides A.C. current output. The output from the chopper 62 includes resistors 63 and 64 connected as a voltage divider with the tap 65 being connected via lead 53 to the contact d of the switch 22. With resistor 60 in circuit as illustrated, the potentiometer 61 is adjused until the meter 39 reads a current corresponding to the calibrating position which actuates relay 40, as previously described. The outer shield 46' of the cable 46 is connected through resistors 66, 67 and 68 to switch contacts b, c and d of switch 59.

Assuming that the resistors 66, 67 and 68 have values of 25 megohms, 50 megohms, and 75 megohms respectively, then with the switch 59 at position b, should the cable leakage be equal to or less than 75 megohms, the realy 40 will be actuated to indicate a faulty cable. Similarly, with the switch at position c, a leakage resistance equal to or less than 50 megohms will actuate the relay 40, while at position d, a leakage resistance equal to or less than 25 megohms will actuate the relay.

With the invention as described above and upon proper calibration of the circuits as described, one or more cables can be quickly and easily tested for both continuity and leakage by simply setting the switches 47 and 49 to the allowable limit for both continuity and leakage, and then setting switch 20 either to contact c or d, depending on the type of measurement desired.

While only one embodiment of the invention has been illustrtaed and described, it is understood that changes, alterations and modifications may be made without departing from the true scope and spirit thereof as defined by the appended claims.

What is claimed is:

1. Apparatus for testing the continuity and leakage in electric cable conductors comprising a Wheatstone bridge having first, second, third and fourth legs connected in series one with the others to form four intermediate junctions, each of said legs including at least one impedance, variable impedance means in series with at least one of said leg impedances for balancing said bridge, means connected with one pair of opposing junctions formed by the connection of the first and third legs and by the junction of the second and fourth legs for energizing said bridge, a common ground, a plurality of scale factor impedances, first switch means interconnected with said scale factor impedances, ground and the impedance in said fourth leg to selectively introduce said scale factor impedances in series between ground and said fourth leg impedance, second multi-position switch means interconneced with said third leg impedance and having a terminal for connection of a cable conductor to be tested and a terminal connected to ground, the last said switch means in one position connecting said cable conductor in series between the impedance of said third leg and ground and in another position connecting the impedance of said third leg directly to ground, said ground constituting the junction between the impedances in said third and fourth legs, a third multi-position switch, an A.C. amplifier, a connection between said amplifier and ground, a second connection between said amplifier and said third switch means and a connection between said third switch means and the junction between said first and second legs of said bridge, said third switch being operable in one position to feed an output signal from said bridge to said amplifier, indicating means connected to said amplifier for indicating the magnitude of said amplified bridge voltage, a source of high voltage, a pair of terminal means for attachment of a pair of conductors of a cable to test leakage therebetween, a connection between one of said terminals and one side of said high voltage source, a load impedance, a plurality of resistors, connections between one end of each of said resistors and the other of said terminals, fourth multi-position switch means connected to the other ends of said resistors and to one side of said load impedance, a connection between the other side of said load impedance and ground, a connection between the other side of said high voltage source and ground, said fourth switch means selectively placing said resistors in series with said load impedance, a chopper having an input connected to said load impedance and producing an interrupted output voltage having a peak value substantially equal to the voltage across said load, an electrical connection between the output of said chopper and said third switch means whereby said third switch in another position feeds said interrupted voltage to said amplifier, and a magnetic coupling between said second and third switch means for simultaneously operating said switches to selectively connect said bridge and chopper signals to said indicating means.

2. Apparatus according to claim 1 wherein said amplifier includes an output indicator calibrated to show zero current and a predetermined maximum current and said indicating means includes a relay operable by said predetermined maximum current.

3. Apparatus according to claim 2 including automatically operable selector switch means, means for connecting a plurality of cables to be tested to said selector switch means, connections between said selector switch means and said third and fourth switch means and connections between said relay and said selector switch to stop said selector switch when said relay is actuated.

References Cited by the Examiner

UNITED STATES PATENTS

| | | | |
|---|---|---|---|
| 2,434,336 | 1/48 | Snook | 324—51 X |
| 2,460,688 | 2/49 | Gambrill et al. | 324—52 |
| 2,476,317 | 7/49 | Nelson et al. | 324—52 |
| 2,481,655 | 9/49 | Gambrill | 324—52 |
| 2,635,135 | 4/53 | Lamont | 324—62 X |
| 2,711,650 | 6/55 | Weisheit | 324—62 X |
| 2,883,618 | 4/59 | Nuut | 324—62 |
| 2,950,437 | 8/60 | Stahl | 324—51 X |

WALTER L. CARLSON, *Primary Examiner.*

BENNETT G. MILLER, *Examiner.*